United States Patent Office 3,426,276
Patented Feb. 4, 1969

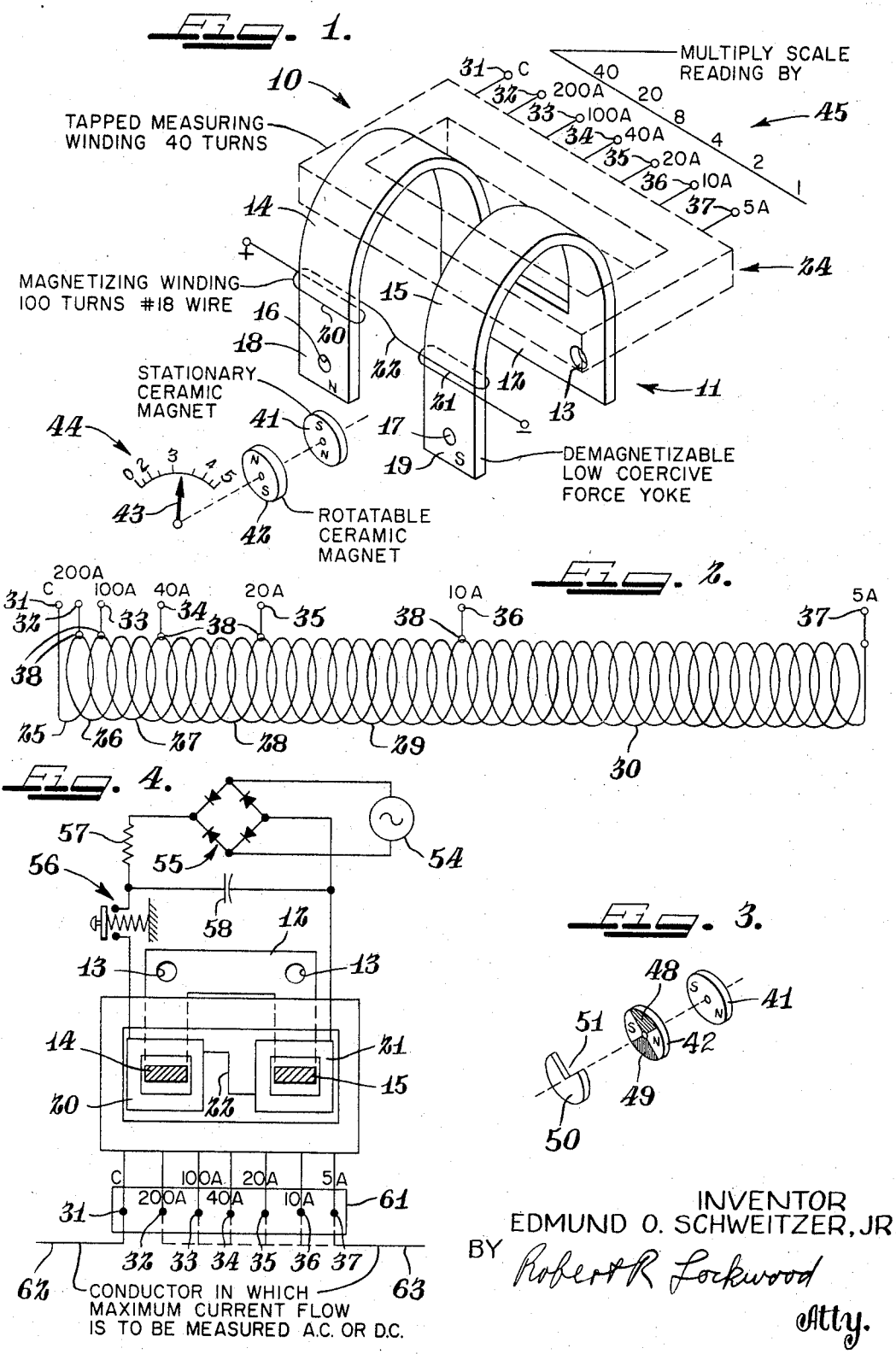

3,426,276
ELECTRIC CURRENT MEASURING MEANS USING DEMAGNETIZABLE YOKE
Edmund O. Schweitzer, Jr., 1002 Dundee Road, Northbrook, Ill. 60062
Filed Oct. 30, 1964, Ser. No. 407,719
U.S. Cl. 324—127                                20 Claims
Int. Cl. G01r 29/00

ABSTRACT OF THE DISCLOSURE

A current responsive device employs a demagnetizable bifurcated yoke of magnetic material having a tapped measuring winding surrounding both of its arms for connection in a circuit in which alternating current flow is to be measured. A magnetizing winding surrounds each arm for energization from a direct current source. A stationary permanent magnet is adjacent the distal ends of the arms and its poles are related to the poles of the arms to produce a resultant magnetic field. A rotatable permanent magnet adjacent the stationary permanent magnet takes up a position according to the position of the resultant magnetic field.

---

This invention relates, generally, to means for measuring current flow, either alternating current or direct current, in a conductor, and it has particular relation to measurement of maximum current flow and current flow in excess of a predetermined minimum value in a plurality of current ranges. It constitutes an improvement over the inventions disclosed in my copending now abandoned applications Ser. Nos. 243,113, filed Dec. 7, 1962, 301,412, filed Aug. 12, 1963, and 329,820, filed Dec. 11, 1963.

This invention employs a bifurcated yoke of low coercive force magnetic material with the arms of U-shape and arranged to receive a winding comprising one or more turns through which flows the current that is to be measured. The yoke is magnetized to saturation by flow of direct current through individual windings on the arms in order to produce opposite poles at the distal ends thereof. A stationary permanent magnet is mounted adjacent these distal ends with its poles so related to the poles of said arms as to produce a resultant magnetic field the magnitude and direction of which are determined by the degree of magnetization of the yoke. A rotatable permanent magnet is located adjacent the stationary permanent magnet and it takes up a position corresponding to the position of the resultant magnetic field. On flow of current through the winding, the position of the resultant magnetic field is shifted and the rotatable permanent magnet is correspondingly affected. In one modification the rotatable permanent magnet has a pointer that is movable therewith relative to a scale. The pointer remains in the position to which it is moved by the rotatable permanent magnet in response to maximum current flow through the winding. In another modification, the rotatable permanent magnet carries a target that moves with a snap action from one position to another when the current flow in the winding exceeds a predetermined value. The winding is tapped to provide several current ranges in order to afford a sensitivity corresponding to the magnitude of the current flow.

Among the objects of this invention are: To provide for measuring maximum current flow in a circuit or indicating when a predetermined current flow has taken place in the circuit in a new and improved manner; and to accomplish such operations over a wide range of current flow while maintaining a relatively high degree of accuracy for each range.

In the drawing: FIG. 1 illustrates in perspective and diagrammatically a variable range current responsive device embodying the present invention.

FIG. 2 shows in more detail certain features of the tapped measuring winding.

FIG. 3 shows a modification of the arrangement and construction of the relatively stationary and movable permanent magnet shown in FIG. 1.

FIG. 4 is a sectional view, somewhat diagrammatic in character, showing certain details of construction of the yoke and windings thereon together with the circuit connections thereto.

In FIG. 1 the reference character 10 designates, generally, a variable range current responsive device. It includes a bifurcated yoke 11 that is formed of low coercive force magnetic material which can be readily magnetized and demagnetized. The yoke 11 includes a base section 12 provided with mounting holes 13 near the ends. From the base section 12 U-shaped arms 14 and 15 extend in parallel relationship with mounting holes 16 and 17 at their distal ends 18 and 19. It will be noted that the distal ends 18 and 19 of the U-shaped arms 14 and 15 extend generally parallel to the base section 12 and those portion of the arms 14 and 15 extending therefrom.

Provision is made for magnetizing the bifurcated yoke 11 to saturation through the provision of magnetizing windings 20 and 21 that are mounted individually on the arms 14 and 15 and are connected in series circuit relation by a conductor 22. For illustrative purposes it is pointed out that each of the magnetizing windings 20 and 21 may comprise 100 turns of #18 insulated wire. Other numbers of turns and a parallel connection can be employed instead of the series connection provided that, on flow of direct current, the distal ends 18 and 19 are magnetized to the polarities indicated, i.e., north and south polarities or poles, with the yoke 11 being magnetized to saturation. Any suitable source of direct current can be employed such as a battery or rectified alternating current.

With a view to demagnetizing the yoke 11 for measuring purposes and in a number of different current ranges, a tapped measuring winding, indicated generally at 24, is employed with the turns thereof extending around both of the arms 14 and 15.

In FIG 2 there is illustrated a preferred arrangement for the tapped measuring winding 24. Here it will be observed that the winding 24 is divided into six sections indicated at 25, 26, 27, 28, 29 and 30. Section 25 comprises a single turn of #6 wire as does section 26. Section 27 comprises three turns of #12 wire while section 28 comprises five turns of #12 wire. Section 29 comprises ten turns of #20 wire and section 30 comprises twenty turns of #20 wire. As indicated, terminals 31 to 37 inclusive are connected to these winding sections with the intermediate terminals being connected to taps 38 as shown. By providing the different numbers of turns for the sections of the measuring winding 24 in different wire sizes, it is possible to accommodate a wide range of current flow. For example, winding section 25 is intended for use in a circuit in which the current flow ranges up to 200 amperes while section 26 together with section 25 is arranged to accommodate current flow up to 100 amperes. In like manner sections 25, 26 and 27 are arranged to accommodate current flow up to 40 amperes; sections 25, 26, 27 and 28 are arranged to accommodate current flow up to 20 amperes; sections 25, 26, 27, 28 and 29 are arranged to accommodate current flow up to 10 amperes; and sections 25, 26, 27, 28, 29 and 30 are arranged to accommodate current flow to 5 amperes. It will be observed that there are a total of 40 turns in the measuring winding 24 and that the product of the number of turns connected between the common terminal 31 and any of the other terminals 32 to 37 inclusive times the indicated maximum current flow therethrough equals 200. In other words, a current flow of 200 amperes through winding section 25 has the same demagnetizing action as a flow of 5 amperes through the entire 40 turns of the measuring winding 24 with respect to demagnetizing the yoke 11 after it has been magnetized to saturation by suitable current flow through the magnetizing windings 20 and 21.

In order to make use of the variation in demagnetization of the yoke 11 there is provided a stationary ceramic magnet 41 intermediate the distal ends 18 and 19 of the arms 14 and 15. The stationary ceramic magnet 41 may be of annular configuration with north and south poles located along a diameter thereof. The axis along which the north and south poles of the stationary ceramic magnet 41 lie extends transversely to the axis along which the north and south poles of the distal ends 18 and 19 lie. Preferably these axes are not at right angles to each other but rather are at an angle of 110° apart in order to provide for maximum separation of the divisions of a scale to be described presently.

Adjacent the stationary ceramic magnet 41 there is mounted a rotatable ceramic magnet 42 which preferably is annular in configuration and is provided with diametrically located north and south poles along an axis. The rotatable ceramic magnet 42 is free to rotate and to take up a position which corresponds to the magnetic field which is the resultant of the magnetic fields from the north and south poles at the distal ends 18 and 19 of the arms 14 and 15 and the north and south poles of the stationary ceramic magnet 41. Since the magnetic field from the stationary ceramic magnet 41 does not change while the magnetic field from the distal ends 18 and 19 changes, depending upon the degree of demagnetization of the yoke 11, as the result of current flow through the measuring winding 24, the resultant magnetic field shifts and it is accompanied by a corresponding shift in the position of the rotatable ceramic magnet 42.

Attached to and movable with the rotatable ceramic magnet 42 is a pointer 43. It is arranged to move relative to a scale, indicated at 44, which may be provided with divisions ranging from 0 to 5 with intermediate divisions indicating half way positions. A preferred mounting arrangement for the magnets 41 and 42, the pointer 43 and the scale 44 is shown in my copending application Ser. No. 491,000, filed Sept. 28, 1965.

Assuming that the yoke 11 has been magnetized to saturation, the rotatable ceramic magnet 42 takes up a position in accordance with the position of the resultant of the magnetic fields from the north and south poles of the distal ends 18 and 19 and of the north and south poles of the stationary ceramic magnet 41. Under these conditions the pointer 43 registers with the zero on the scale 44. Now, assuming that a flow of 5 amperes of alternating current takes place through the entire measuring winding 24 between the terminals 31 and 37, the demagnetizing action resulting from such current flow on the yoke 11 is such as to cause the rotatable ceramic magnet 42 to shift its position to bring the pointer 43 to register with the 5 on the scale 44. On cessation of flow of current in the winding 24, the rotatable ceramic magnet 42 remains in the position to which it has been rotated and thus indicates the maximum current flow that has taken place. Then it is necessary to reset the variable range current responsive device 10 by energizing the magnetizing windings 20 and 21 in the manner described. The device has an accuracy of the order of 10% of full scale reading.

In order to provide a measure of the current flow when connections are made to any of the other terminals 32 to 36 inclusive, a multiplier is employed as indicated, generally, at 45 in FIG. 1. Here it will be observed that the multiplier for the connection to terminal 37 is one and thus a direct reading of the position of the pointer 43 with respect to the scale 44 can be had. When the connection is made to terminal 36, the ten ampere connection, the multiplier is two; for the terminal 35 and the twenty ampere connection, the multiplier is four; for the terminal 34 and the forty ampere connection, the multiplier is eight; for the terminal 33 and the one hundred ampere connection, the multiplier is twenty; and for the terminal 32 and the two hundred ampere connection, the multiplier is forty.

By changing the position of the stationary ceramic magnet 41 from that shown in FIG. 1 to that shown in FIG. 3, it is possible to cause the rotatable ceramic magnet 42 to rotate with a snap action from one significant to another significant position on flow of predetermined current through the winding 24. For such an arrangement, the north and south poles of the stationary ceramic magnet 41 are shifted so that they oppose with substantially maximum effect the north and south poles, respectively, at the distal ends 18 and 19 of the furcations 14 and 15.

Under these conditions the rotatable ceramic magnet 42 occupies a position generally along the axis of the north and south poles of the distal ends 18 and 19 and of the stationary ceramic magnet 41. This is the position in which the rotatable ceramic magnet 42 is shown in FIG. 3 while the polarities of the poles on the stationary ceramic magnet 41 are as shown. Now, when a current, for example 80% of full scale, flows through the measuring winding 24, there is a corresponding demagnetization of the yoke 11. Because of the generally in line relationships of the magnetic fields from the distal ends 18 and 19 and from the stationary ceramic magnet 41, no movement of the rotatable ceramic magnet 42 takes place until the yoke 11 is demagnetized to this extent. Thereupon, the rotatable magnet 42 moves with a snap action to a position such that its north and south poles register, respectively, with the south and north poles of the stationary ceramic magnet 41. Advantage is taken of this significant movement of the rotatable ceramic magnet 42 to provide it with a target 48 that may be colored green and another diametrically opposite target 49 that may be colored red. Alternatively these targets 48 and 49 can be positioned on a disc that moves with the rotatable ceramic magnet 42 or only the red target 49 can be employed on an aluminum disc. Then, in front of the rotatable ceramic magnet 42 there is positioned a mask 50 which has a sector shaped opening 51 through which either the target 48 or the target 49 is visible, depending upon the position of the rotatable ceramic magnet 42. It will be understood that, with the current flowing between the terminals 31 and 32, the rotatable ceramic magnet 42 will shift from the position shown in FIG. 3 to its alternate position where the red target 49 is visible through the opening 51 in the mask 50 on flow of current through the single turn section 25 of about 160 amperes. A preferred mounting arrangement for the magnets 41 and 42 and the mask 50 is shown in my copending application Ser. No. 491,000, filed Sept. 28, 1965.

If the connection is to terminal 33, then a current flow of 80 amperes through winding sections 25 and 26 will cause the rotatable ceramic magnet 42 to shift its position in the manner described. The shift will take place at correspondingly lower current values when the connection is made to the terminals 34, 35, 36 and 37 respectively.

As shown in FIG. 4 the magnetizing windings 20 and 21 can be energized from a source 54 of alternating current such as a 60-cycle 115-volt source through a full wave rectifier indicated, generally, at 55 on closure of the energizing circuit by a push button switch 56. If desired, a half wave rectifier can be employed instead of the full wave rectifier 55. The rectifier 55 is connected through a resistor 55 to charge a capacitor 58 having a capacitance of 40–80 microfarads. On closure of the switch 56 the capacitor 58 discharges through the windings 20 and 21 to magnetize the yoke 11.

Also as shown in FIG. 4, the terminals 31 to 37 inclusive can be mounted on a terminal board 61. One section 62 of the conductor in which the maximum current flow is to be measured is connected to the common terminal 31. Another section 63 of the conductor is connected to terminal 37 or to any of the other terminals 32 to 36 inclusive, as shown by the broken line connections, depending upon the magnitude of the expected current flow. The particular connection that is selected is governed by the accuracy with which it is desired to read the scale 44.

The variable range current responsive device 10 can be employed in connection with a single phase two wire circuit for indicating the maximum current flow therein or if a predetermined current has flowed in the circuit. Two of these devices can be employed in a single phase three wire circuit by connecting them in the conductors that are energized at maximum opposite voltage for the purpose of determining the degree in which the circuit is in balance in which case a minimum or zero current flows in the third or neutral conductor. Likewise three of these devices can be employed in a three phase circuit for balancing or other purposes.

While the preferable configuration of the yoke 11 is that shown in the drawing, it can be in planar form with the arms 14 and 15 extending from the base section 12 in the plane thereof. The magnetizing windings 20 and 21 and the tapped measuring winding 24 are located on the yoke 11 of flat configuration in the arrangement as illustrated in FIG. 4.

What is claimed as new is:

1. In an alternating current responsive device, a demagnetizable bifurcated yoke of magnetic material, a measuring winding surrounding both arms of said yoke for connection in a circuit in which alternating current flow is to be measured whereby said arms are subjected to change in magnetization in the same direction in accordance with the magnitude of such current flow, a magnetizing winding surrounding each arm for connection to a direct current source for magnetizing the distal ends of said arms with opposite poles, a stationary permanent magnet adjacent said distal ends of said arms with its poles related to said poles of said arms to produce a resultant magnetic field whose position is determined by the strength of said poles of said arms, and a rotatable permanent magnet adjacent said stationary permanent magnet taking up a position according to the position of said resultant magnetic field.

2. In an alternating current responsive device, a demagnetizable bifurcated yoke of magnetic material magnetized to provide opposite poles at the distal ends of its arms, a measuring winding comprising a plurality of turns surrounding both arms of said yoke for connection in a circuit in which alternating current flow is to be measured whereby said arms are subjected to change in magnetization in the same direction in accordance with the magnitude of such current flow, a stationary permanent magnet adjacent said distal ends of said arms with its poles related to said poles of said arms to produce a resultant magnetic field whose position is determined by the strength of said poles of said arms, and a rotatable permanent magnet adjacent said stationary permanent magnet taking up a position according to the position of said resultant magnetic field.

3. In an alternating current responsive device, a demagnetizable bifurcated yoke of magnetic material, a measuring winding comprising a plurality of turns surrounding both arms of said yoke for connection in a circuit in which alternating current flow is to be measured whereby said arms are subjected to change in magnetization in the same direction in accordance with the magnitude of such current flow, means for magnetizing the distal ends of said arms with opposite poles, a stationary permanent magnet adjacent said distal ends of said arms with its poles related to said poles of said arms to produce a resultant magnetic field whose position is determined by the strength of said poles of said arms, and a rotatable permanent magnet adjacent said stationary permanent magnet taking up a position according to the position of said resultant magnetic field.

4. In a variable range alternating current responsive device, a demagnetizable bifurcated yoke of magnetic material, a tapped measuring winding surrounding both arms of said yoke for connection in a circuit in which alternating current flow is to be measured whereby said arms are subjected to change in magnetization in the same direction in accordance with the magnitude of such current flow, a magnetizing winding surrounding each arm for connection to a direct current source for magnetizing the distal ends of said arms with opposite poles, a stationary permanent magnet adjacent said distal ends of said arms with its poles related to said poles of said arms to produce a resultant magnetic field whose position is determined by the strength of said poles of said arms, and a rotatable permanent magnet adjacent said stationary permanent magnet taking a position according to the position of said resultant magnetic field for the selected tap.

5. In a variable range alternating current responsive device, a demagnetizable bifurcated yoke of magnetic material magnetized to provide opposite poles at the distal ends of its arms, a tapped measuring winding surrounding both arms of said yoke for connection in a circuit in which alternating current flow is to be measured whereby said arms are subjected to change in magnetization in the same direction in accordance with the magnitude of such current flow, a stationary permanent magnet adjacent said distal ends of said arms with its poles related to said poles of said arms to produce a resultant magnetic field whose position is determined by the strength of said poles of said arms, and a rotatable permanent magnet adjacent said stationary permanent magnet taking a position according to position of said resultant magnetic field for the selected tap.

6. In a variable range alternating current responsive device, a demagnetizable bifurcated yoke of magnetic material, a tapped measuring winding comprising a plurality of turns surrounding both arms of said yoke for connection in a circuit in which alternating current flow is to be measured whereby said arms are subjected to change in magnetization in the same direction in accordance with the magnitude of such current flow, means for magnetizing the distal ends of said arms with opposite poles, a stationary permanent magnet adjacent said distal ends of said arms with its poles related to said poles of said arms to produce a resultant magnetic field whose position is determined by the strength of said poles of said arms, and a rotatable permanent magnet adjacent said stationary permanent magnet taking a position according to the position of said resultant magnetic field for the selected tap.

7. In a variable range alternating current responsive device, a demagnetizable bifurcated yoke of magnetic material, a tapped measuring winding comprising a plurality of turns surrounding both arms of said yoke for connection in a circuit in which alternating current flow is to be measured whereby said arms are subjected to change in magnetization in the same direction in accordance with the magnitude of such current flow, the number of turns of said winding between taps corresponding to the current range of the respective tap, means for magnetizing the distal ends of said arms with opposite poles, a stationary permanent magnet adjacent said distal ends of said arms to produce a resultant magnetic field whose position is determined by the strength of said poles of said arms, and a rotatable permanent magnet adjacent said stationary permanent magnet taking a position according to the position of said resultant magnetic field for the selected tap.

8. In a maxmeter having a scale and a pointer movable relative thereto, a demagnetizable bifurcated yoke of magnetic material, a measuring winding surrounding both arms of said yoke for connection in a circuit in which the maximum alternating current flow is to be measured whereby said arms are subjected to change in magnetization in the same direction in accordance with the magnitude of such current flow, a magnetizing winding surrounding each arm for connection to a direct current source for magnetizing the distal ends of said arms with opposite poles, a stationary permanent magnet adjacent said distal ends of said arms to produce a resultant magnetic field whose position is determined by the strength of said poles of said arms, and a rotatable permanent magnet adjacent said stationary permanent magnet, taking up a position according to the position of said resultant magnetic field, and connected to said pointer to move it relative to said scale to a position corresponding to the maximum alternating current flow in said measuring winding.

9. In a maxmeter having a scale and pointer movable relative thereto, a demagnetizable bifurcated yoke of magnetic material magnetized to provide opposite poles at the distal ends of its arms, a measuring winding comprising a plurality of turns surrounding both arms of said yoke for connection in a circuit in which the maximum alternating current flow is to be measured whereby said arms are subjected to change in magnetization in the same direction in accordance with the magnitude of such current flow, a stationary permanent magnet adjacent said distal ends of said arms with its poles related to said poles of said arms to produce a resultant magnetic field whose position is determined by the strength of said poles of said arms, and a rotatable permanent magnet adjacent said stationary permanent magnet, taking up a position according to the position of said resultant magnetic field, and connected to said pointer to move it relative to said scale to a position corresponding to the maximum alternating current flow in said measuring winding.

10. In a maxmeter having a scale and a pointer movable relative thereto, a demagnetizable bifurcated yoke of magnetic material, a measuring winding comprising a plurality of turns surrounding both arms of said yoke for connection in a circuit in which the maximum alternating current flow is to be measured whereby said arms are subjected to change in magnetization in the same direction in accordance with the magnitude of such current flow, means for magnetizing the distal ends of said arms with opposite poles, a stationary permanent magnet adjacent said distal ends of said arms with its poles related to said poles of said arms to produce a resultant magnetic field whose position is determined by the strength of said poles of said arms, and a rotatable permanent magnet adjacent said stationary permanent magnet, taking up a position according to the position of said resultant magnetic field, and connected to said pointer to move it relative to said scale to a position corresponding to the maximum alternating current flow in said measuring winding.

11. In a variable range maxmeter having a scale and a pointer movable relative thereto, a demagnetizable bifurcated yoke of magnetic material, a tapped measuring winding surrounding both arms of said yoke for connection in a circuit in which the maximum alternating current flow is to be measured whereby said arms are subjected to change in magnetization in the same direction in accordance with the magnitude of such current flow, a magnetizing winding surrounding each arm for connection to a direct current source for magnetizing the distal ends of said arms with opposite poles, a stationary permanent magnet adjacent said distal ends of said arms with its poles related to said poles of said arms to produce a resultant magnetic field whose position is determined by the strength of said poles of said arms, and a rotatable permanent magnet adjacent said stationary permanent magnet, taking a position according to the position of said resultant magnetic field, and connected to said pointer to move it relative to said scale to a position corresponding to the maximum alternating current flow in said measuring winding.

12. In a variable range maxmeter having a scale and a pointer movable relative thereto, a demagnetizable bifurcated yoke of magnetic material magnetized to provide opposite poles at the distal ends of its arms, a tapped measuring winding surrounding both arms of said yoke for connection in a circuit in which the maximum alternating current flow is to be measured whereby said arms are subjected to change in magnetization in the same direction in accordance with the magnitude of such current flow, a stationary permanent magnet adjacent said distal ends of said arms with its poles related to said poles of said arms to produce a resultant magnetic field whose position is determined by the strength of said poles of said arms, and a rotatable permanent magnet adjacent said stationary permanent magnet, taking a position according to the position of said resultant magnetic field, and connected to said pointer to move it relative to said scale to a position corresponding to the maximum alternating current flow in said measuring winding.

13. In a variable range maxmeter having a scale and a pointer movable relative thereto, a demagnetizable bifurcated yoke of magnetic material, a tapped measuring winding comprising a plurality of turns surrounding both arms of said yoke for connection in a circuit in which the maximum alternating current flow is to be measured whereby said arms are subjected to change in magnetization in the same direction in accordance with the magnitude of such current flow, means for magnetizing the distal ends of said arms with opposite poles, a stationary permanent magnet adjacent said distal ends of said arms with its poles related to said poles of said arms to produce a resultant magnetic field whose position is determined by the strength of said poles of said arms, and a rotatable permanent magnet adjacent said stationary permanent magnet, taking a position according to the position of said resultant magnetic field, and connected to said pointer to move it relative to said scale to a position corresponding to the maximum alternating current flow in said measuring winding.

14. In a variable range maxmeter having a scale and a pointer movable relative thereto, a demagnetizable bifurcated yoke of magnetic material, a tapped measuring winding comprising a plurality of turns surrounding both arms of said yoke for connection in a circuit in which the maximum alternating current flow is to be measured whereby said arms are subjected to change in magnetization in the same direction in accordance with the magnitude of such current flow, the number of turns of said winding between taps corresponding to the current range of the respective tap for full scale deflection of said pointer, means for magnetizing the distal ends of said arms with opposite poles, a stationary permanent magnet adjacent said distal ends of said arms with its poles related to said poles of said arms to produce a resultant magnetic field whose position is determined by the strength of said poles of said arms, and a rotatable permanent magnet adjacent said stationary permanent magnet, taking a position according to the position of said resultant magnetic field, and connected to said pointer to move it relative to said scale to a position corresponding to the maximum alternating current flow in said measuring winding.

15. In an alternating current responsive device having a target shiftable from one position to another position, a demagnetizable bifurcated yoke of magnetic material, a measuring winding surrounding both arms of said yoke for connection in a circuit in which on predetermined alternating current flow therein said target is to be shifted, whereby said arms are subjected to change in magnetization in the same direction in accordance with the magnitude of such current flow, a magnetizing winding surrounding each arm for connection to a direct current source for magnetizing the distal ends of said arms with opposite poles, a stationary permanent magnet adjacent said distal ends of said arms with its poles related to said poles of said arms to produce a resultant magnetic field whose position is determined by the strength of said poles of said arms, and a rotatable permanent magnet adjacent said stationary permanent magnet, taking up a position according to the position of said resultant magnetic field, and connected to said target for shifting it from said one position to said other position on flow of said predetermined alternating current in said measuring winding.

16. In an alternating current responsive device having a target shiftable from one position to another position, a demagnetizable bifurcated yoke of magnetic material magnetized to provide opposite poles at the distal ends of its arms, a measuring winding comprising a plurality of turns surrounding both arms of said yoke for connection in a circuit in which on predetermined alternating current flow therein said target is to be shifted whereby said arms are subjected to change in magnetization in the same direction in accordance with the magnitude of such current flow, a stationary permanent magnet adjacent said distal ends of said arms with its poles related to said poles of said arms to produce a resultant magnetic field whose position is determined by the strength of said poles of said arms, and a rotatable permanent magnet adjacent said stationary permanent magnet, taking up a position according to the position of said resultant magnetic field, and connected to said target for shifting it from said one position to said other position on flow of said predetermined alternating current in said measuring winding.

17. In an alternating current responsive device having a target shiftable from a non-indicating to an indicating position, a demagnetizable bifurcated yoke of magnetic material, a measuring winding comprising a plurality of turns surrounding both arms of said yoke for connection in a circuit in which on predetermined alternating current flow therein said target is shifted whereby said arms are subjected to change in magnetization in the same direction in accordance with the magnitude of such current flow, means for magnetizing the distal ends of said arms with opposite poles, a stationary permanent magnet adjacent said distal ends of said arms with its poles related to said poles of said arms to produce a resultant magnetic field whose position is determined by the strength of said poles of said arms, and a rotatable permanent magnet adjacent said stationary permanent magnet, taking up a position according to the position of said resultant magnetic field, and connected to said target to shift it from said non-indicating position to said indicating position on flow of said predetermined alternating current in said measuring winding.

18. In a variable range alternating current responsive device having a target shiftable from a non-indicating position to an indicating position, a demagnetizable bifurcated yoke of magnetic material, a tapped measuring winding surrounding both arms of said yoke for connection in a circuit in which on predetermined alternating current flow therein said target is to be shifted whereby said arms are subjected to change in magnetization in the same direction in accordance with the magnitude of such current flow, a magnetizing winding surrounding each arm for connection to a direct current source for magnetizing the distal ends of said arms with opposite poles, a stationary permanent magnet adjacent said distal ends of said arms with its poles related to said poles of said arms to produce a resultant magnetic field whose position is determined by the strength of said poles of said arms, and a rotatable permanent magnet adjacent said stationary permanent magnet, taking a position according to the position of said resultant magnetic field and connected to said target to shift it from said non-indicating position to said indicating position on flow of said predetermined alternating current in said measuring winding for the selected tap.

19. In a variable range alternating current responsive device having a target shiftable from one position to another position, a demagnetizable bifurcated yoke of magnetic material magnetized to provide opposite poles at the distal ends of its arms, a tapped measuring winding surrounding both arms of said yoke for connection in a circuit in which on predetermined alternating current flow therein said target is to be shifted whereby said arms are subjected to change in magnetization in the same direction in accordance with the magnitude of such current flow, a stationary permanent magnet adjacent said distal ends of said arms with its poles related to said poles of said arms to produce a resultant magnetic field whose position is determined by the strength of said poles of said arms, and a rotatable permanent magnet adjacent said stationary permanent magnet, taking a position according to the position of said resultant magnetic field, and connected to said target to shift it from said one position to said other position on flow of said predetermined alternating current in said measuring winding for the selected tap.

20. In a variable range alternating current responsive device having a target shiftable from one position to another position, a demagnetizable bifurcated yoke of magnetic material, a tapped measuring winding comprising a plurality of turns surrounding both arms of said yoke for connection in a circuit in which on predetermined alternating current flow therein said target is to be shifted whereby said arms are subjected to change in magnetization in the same direction in accordance with the magnitude of such current flow, the number of turns of said winding between taps corresponding to the current range of the respective tap for operation of said target, means for magnetizing the distal ends of said arms with opposite poles, a stationary permanent magnet adjacent said distal ends of said arms with its poles related to said poles of said arms to produce a resultant magnetic field whose position is determined by the strength of said poles of said arms, and a rotatable permanent magnet adjacent said stationary permanent magnet, taking a position according to the position of said resultant magnetic field, and connected to said target to shift it from said one position to said other position on flow of said predetermined alternating current in said measuring winding for the selected tap.

References Cited

UNITED STATES PATENTS

| | | | |
|---|---|---|---|
| 1,940,521 | 12/1933 | Acosta | 324—34 |
| 2,018,459 | 10/1935 | Menger | 340—253 |
| 2,585,974 | 2/1952 | Taylor et al. | 324—34 |
| 2,817,816 | 12/1957 | Medlar | 324—151 XR |

RUDOLPH V. ROLINEC, *Primary Examiner.*

A. E. SMITH, *Assistant Examiner.*

U.S. Cl. X.R.

324—103, 115; 340—253